United States Patent
Kobayashi

[11] Patent Number: 5,483,048
[45] Date of Patent: Jan. 9, 1996

[54] APPARATUS AND METHOD FOR READING AND WRITING VALUE DATA IN A CARD

[75] Inventor: Yuji Kobayashi, Saitama, Japan

[73] Assignee: Sanyo Electric Co., Ltd., Moriguchi, Japan

[21] Appl. No.: 975,904

[22] Filed: Nov. 12, 1992

Related U.S. Application Data

[63] Continuation of Ser. No. 605,838, Oct. 30, 1990, abandoned.

[30] Foreign Application Priority Data

| Nov. 1, 1989 | [JP] | Japan | 1-286610 |
| Nov. 7, 1989 | [JP] | Japan | 1-289211 |
| Dec. 14, 1989 | [JP] | Japan | 1-325431 |

[51] Int. Cl.$^6$ .................................................. G06K 5/00
[52] U.S. Cl. .................... 235/380; 235/382; 235/375
[58] Field of Search ................................ 235/380, 382, 235/437, 382.5, 385, 449, 487, 494, 440, 375; 380/20, 21, 22, 23; 902/1, 4

[56] References Cited

U.S. PATENT DOCUMENTS

| 4,001,550 | 1/1977 | Schatz | 902/4 |
| 4,322,613 | 3/1982 | Oldenkamp | 902/4 |
| 4,665,396 | 5/1987 | Dieleman | 235/382 |
| 4,736,423 | 4/1988 | Matyas | 380/23 |
| 4,989,244 | 1/1991 | Naruse et al. | 380/20 |

FOREIGN PATENT DOCUMENTS

| 1593377 | 7/1981 | United Kingdom . |
| 2152720 | 8/1985 | United Kingdom . |
| 2157867 | 10/1985 | United Kingdom . |

*Primary Examiner*—Donald T. Hajec
*Assistant Examiner*—Karl Frech
*Attorney, Agent, or Firm*—Darby & Darby

[57] ABSTRACT

A card handling apparatus includes a reader/writer incorporated in a vending machine, and the reader/writer reads the encoded data representative of a present value, which is written in a first recording portion of a prepaid card, in accordance with decoding data recorded in a second recording portion of the card. Thereafter, the inspection data representative of a residual value of "0" is encoded in accordance with another encoding method and written in the first recording portion of the card for recording the value data after a payment for a price of a sold item. The inspection data as written is read again to be compared with the inspection data intended to be written. If the both are not coincident with each other, a failure or abnormality develops in a writing function, and therefore, an operation of the reader/writer is stopped. If the both are coincident with each other, no abnormality develops in a reading/writing function. In this case, the residual value data sent from the vending machine is encoded in accordance with a still further encoding method and written in the first recording portion, and the decoding data by which the data encoded in accordance with the still further encoding method can be decoded is written in the second recording portion.

11 Claims, 15 Drawing Sheets

F I G. 1
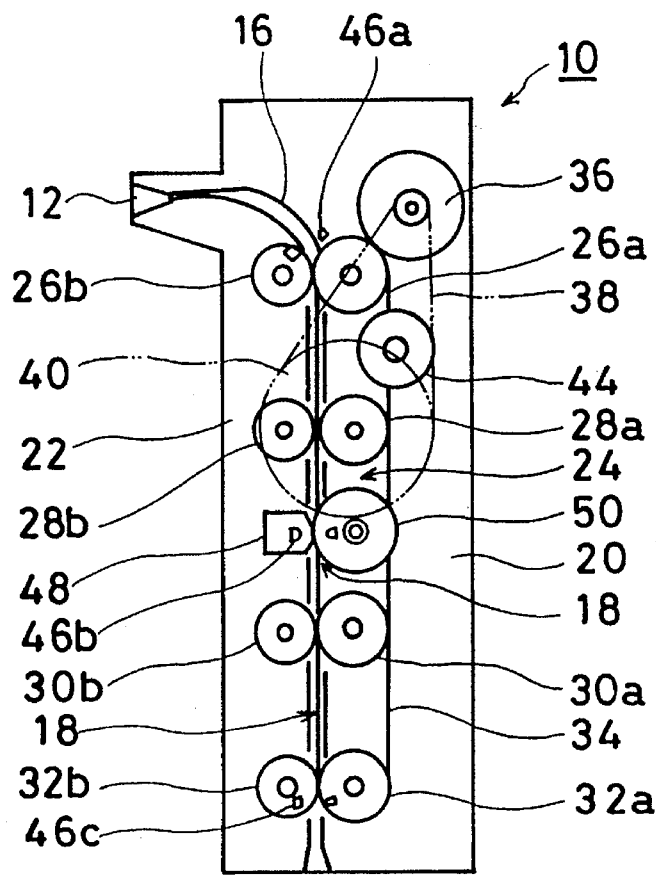
F I G. 2
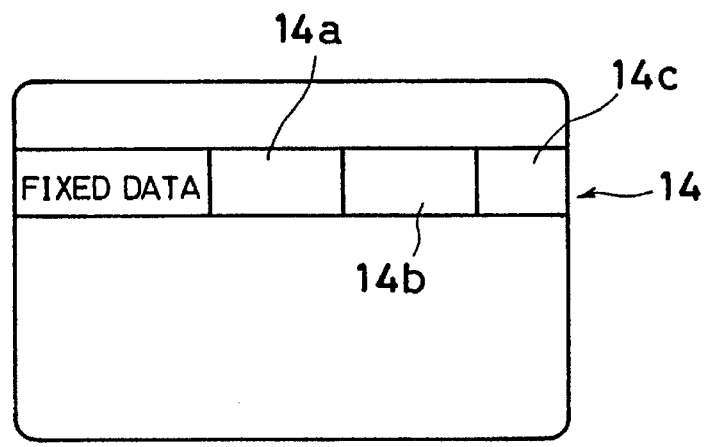

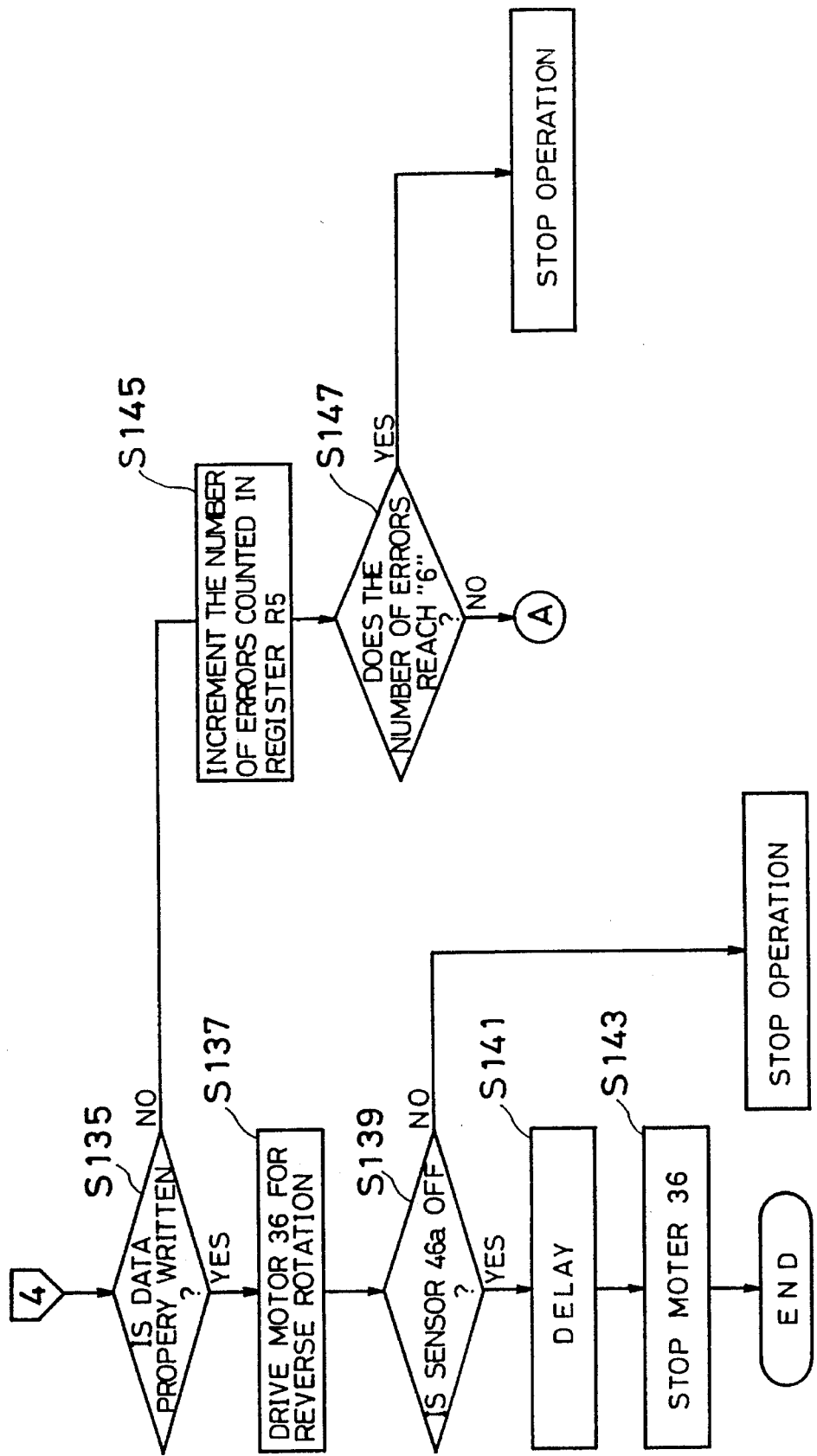

APPARATUS AND METHOD FOR READING AND WRITING VALUE DATA IN A CARD

This is a continuation, of application Ser. No. 07/605,838, filed Oct. 30, 1900 now abandoned.

BACKGROUND OF THE INVENTION

1. Field of the Invention

The present invention relates to an apparatus and method for handling a card. More specifically, the present invention relates to an apparatus and method for handling a card which holds value data that is renewed for each payment or settlement for transactions.

2. Description of the Prior Arts

In such a card system, typically, a magnetic card, IC card or the like for which a predetermined amount of money has been paid in advance (simply called as "prepaid card") is used as the value medium capable of payment for items or transactions.

One example of such a kind of a prepaid card handling apparatus is disclosed in, for example, Japanese Patent Laying-Open No. 61-283995. In this prior art, when a magnetic prepaid card is inserted to a reader/writer in order to effect a payment or settlement for an item or transaction, value data recorded in the magnetic prepaid card is read. Then, a price of the item is subtracted from the value data, and value data which is thus renewed is recorded in the magnetic prepaid card again, and the magnetic prepaid card is returned to a card user.

In a prepaid card handling apparatus in which transactions are settled by utilizing such a prepaid card, it is apprehended that the value data recorded in the magnetic prepaid card is unjustly altered or that value data is unjustly written in the magnetic prepaid card.

In addition, one method for preventing such alternation of the value data is disclosed in, for example, Japanese Patent of Laying-Open No. 63-101961. In this prior art, only when a timing signal is written in a specific magnetic stripe, it is possible to read or write value data from or in the magnetic stripe, while the timing signal is erased when the value data becomes "0".

In this prior art, it is also impossible to completely prevent the value data from being altered unjustly because only a specific kind of a reader/writer can control the reading or writing the value data in accordance with the presence or absence of the timing signal and, if another kind of a reader/writer is used, the value data can be unjustly altered again.

Furthermore, if a failure or trouble develops in a magnetic head of a reader/writer for writing or reading the value data in or from a magnetic prepaid card, sales of the items or transactions may be obstacled. For example, if a payment is effected even although a writing head goes wrong, the renewed value data after the payment cannot be written in the magnetic prepaid card, and resultingly, no payment is effected for the item.

SUMMARY OF THE INVENTION

Therefore, a principal object of the present invention is to provide a novel apparatus and method for handling a card.

Another object of the present invention is to provide an apparatus and method for handling a card, in which it is possible to prevent value data from being altered unjustly.

Another object of the present invention is to provide an apparatus and method for handling a card, in which it is impossible to unjustly read value data recorded in a card, and resultingly, unjust alternation of the value data can be prevented.

Another object of the present invention is to provide an apparatus and method for handling a card, in which it is possible to detect a failure or trouble in a reading/writing function prior to transactions, and resultingly, it is possible to prevent the transactions from being unjustly settled.

The other object of the present invention is to provide an apparatus and method for handling a card, in which it is possible to prevent a card from being forcedly and unfairly returned from a reader/writer before renewed value data is written in the card.

A card handling apparatus in accordance with the present invention comprises: reading means for reading data recorded in a card which is entered; writing means for writing data in a card which is entered; first means for controlling the writing means to write predetermined inspection data in a predetermined area of a card after the data is read by the reading means; second means for controlling the reading means to read the data from the card after the predetermined inspection data is written by the writing means therein; judging means for outputting a signal representing that a failure develops in the writing means when data which is read from the predetermined area under control of the second means does not have a predetermined relationship between the predetermined inspection data.

In a card handling apparatus, generally, when a card is entered, data recorded in the card is read by the reading means, and renewed value data is written in the card by the writing means after a payment or settlement for transactions. By utilizing the writing means, the predetermined inspection data is written in the predetermined area of the card under the control of the first means after the data is read by the reading means. Thereafter, under the control of the second means, the data recorded in the card is read again by the reading means, and it is determined by the judging means whether or not there is the predetermined relationship between the data which was read from the predetermined area and the predetermined inspection data, for example, whether or not both the data are coincident with each other. When there is no predetermined relationship between both the data, it is determined that failure or trouble develops in the writing means, and therefore, a failure signal is outputted from the judging means.

In accordance with the present invention, when the failure signal is outputted from the judging means, settlement of transactions may be inhibited, and therefore, it is possible to prevent an unjust settlement which results in that no payment is effected for the transactions.

In addition, if inspection data representing that a card is invalid is written, in a case where the card is forcedly and unfairly returned prior to the payment, i.e. renewal of the value data in the card, the card which was forcedly returned cannot be used thereafter, and resultingly, it is possible to prevent the card from being forcedly and unfairly returned from the reader/writer. In an embodiment in accordance with the present invention, the inspection data representative of value data "0" is written in a residual value data recording area of the card.

In one embodiment in accordance with the present invention, the data are encoded and recorded in the card and decoding data representative of a method for decoding such encoded data is also written in the card. Therefore, in accordance with this embodiment, it is possible to write the data which are encoded in accordance with different encoding methods at every timing when the data are written in the card, and therefore, it becomes impossible to unjustly read the data recorded in the card. Accordingly, it is possible to effectively prevent the data, especially value data, from being unjustly altered.

In this embodiment, a card handling apparatus comprises decoding means for decoding the data read by the reading means in accordance with the decoding data read from the card to obtain decoded data; and encoding means for encoding renewed data in accordance with a further encoding method, wherein the data encoded by the encoding means and further decoding data representative of the further encoding method can be written in the card by the writing means.

In addition, in another aspect of the present invention, after the data encoded by the encoding means and the further decoding data are written in the card, the data are read from the card, and it is judged whether or not the data which is thus read is coincident with the data before the encoding the same by the encoding means. Since a writing operation by the writing means is not performed normally if both the data are not coincident with each other, the card is returned without any settlement. Therefore, an abnormality or failure of the writing means can be determined prior to the settlement for transactions, and resultingly, it is possible to prevent the transactions from being unjustly settled.

Furthermore, it is further determined whether or not the data encoded by the encoding means and the data read by the reading means are coincident with each other and, when the both are not coincident with each other, the writing means may be enabled.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 1 is an illustrative view showing one embodiment in accordance with present invention.

FIG. 2 is an illustrative view showing one example of a recording format of a magnetic prepaid card which can be utilized in FIG. 1 embodiment.

FIGS. 5A–5G are flowcharts showing an operation of another aspect of FIG. 1 embodiment.

DETAILED DESCRIPTION OF THE PREFERRED EMBODIMENTS

Figure 3:
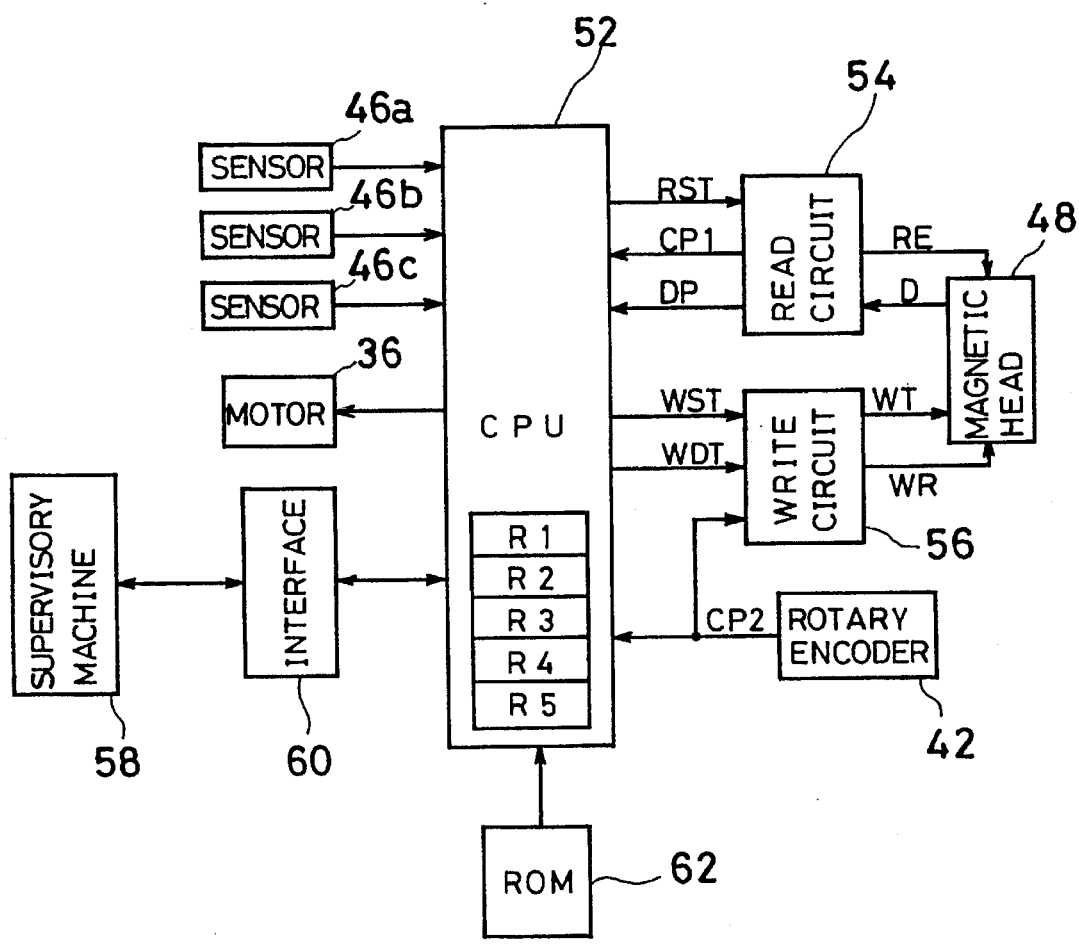
FIG. 3 is a block diagram showing an electrical circuit configuration of FIG. 1 embodiment.

FIG. 1 is an illustrative view showing a reader/writer for a magnetic prepaid card, which is one embodiment in accordance with the present invention. Although an embodiment in which the present invention is applied to a magnetic prepaid card handling apparatus will be described in the following, it is pointed-out in advance that the present invention is applicable to a prepaid card handling apparatus which handles another prepaid card such as a so-called IC prepaid card including a semiconductor memory therein other than the magnetic prepaid card.

With reference to FIG. 1, a reader/writer 10 of this embodiment shown includes a prepaid card insertion port 12 which is formed on an upper portion and oriented in a horizontal direction, and the prepaid card insertion port 12 takes a magnetic prepaid card 14 as shown in FIG. 2 in the reader/writer 10. The prepaid card insertion port 12 is communicated with a feeding path 18 through a bent portion 16. Since the feeding path 18 is formed to be extended in a vertical direction, the magnetic prepaid card inserted from the prepaid card insertion port 12 is fed to the feeding path 18 after a feeding direction thereof is changed by the bent portion 16. The feeding path 18 is formed by a fixed plate 20 and a movable plate 22 therebetween.

A feeding device 24 for feeding the magnetic prepaid card in a vertical direction is provided in the feeding path 18, which includes pulleys 26a, 28a, 30a and 32a aligned in a vertical direction along the feeding path 18 at the right side in FIG. 1 and a belt 34 wound thereon. The pulleys 26a, 28a, 30a and 32a are paired with pulleys 26b, 28b, 30b and 32b aligned in a vertical direction along the feeding path 18 at the left side in FIG. 1, respectively. In addition, a rotation force of a motor 36 which can be rotated in a forward direction and a reverse direction is transferred through a belt 38 to a conversion pulley 40 which is attached on the same shaft as that of the pulley 28a, whereby the pulley 28a and thus the feeding device 24 can be driven by the motor 36.

A rotary encoder 42 shown in FIG. 3 includes a pulley 44 which is rotated by the belt 38, and in response to a rotation of the pulley 44, an encoder pulse is outputted at every predetermined angles.

In addition, three sensors 46a, 46b and 46c are provided in the feeding path 18 in this order from an upstream side to a downstream side along the feeding direction of the prepaid card, and each of the sensors 46a, 46b and 46c includes a pair of a light emitting element and a light receiving element. It will be noted that an interval between the respective sensors 46a, 46b and 46c is set to be smaller than a longitudinal size of the magnetic prepaid card 14. Therefore, the magnetic prepaid card within the feeding path 18 is necessarily sensed by at least one of the sensors 46a, 46b and 46c.

Furthermore, a magnetic head 48 and a pressure roller 50 are provided so as to sandwich the feeding path 18 at the same position as that of the sensor 46b in a midway of the feeding path 18. Although not shown, the magnetic head 48 includes a reading portion (reading head) for reading data from the magnetic prepaid card fed in the feeding path 18 and a writing portion (writing head) for writing data in the magnetic prepaid card. In addition, the pressure roller 50 pressures the magnetic prepaid card fed within the feeding path 18 against the magnetic head 48.

A CPU 52 shown in a block diagram of FIG. 3 is operated in accordance with a program which is set in advance, and the CPU 52 is provided with registers R1–R5 inside thereof. A reading circuit 54 controls the magnetic head 48 in response to a read start signal RST outputted from the CPU 52 to read data from the magnetic prepaid card, and outputs the data as read to the CPU 52. A writing circuit 56 controls the magnetic head 48 in response to a write start signal WST applied from the CPU 52 to write data given from the CPU 52 in the prepaid card.

The reference numeral 58 denotes a supervisory machine which may be a vending machine for providing predetermined services to a prepaid card user on the basis of the value data of the prepaid card entered in the reader/writer 10 or a settlement machine such as a cash register which performs settlement for transactions on the basis of the value data of the prepaid card entered in the reader/writer 10. Then, the supervisory machine 58 is connected to the CPU 52 via an interface 60 and an operation of the reader/writer 10 is controlled by the supervisory machine 58.

In addition, a program for controlling the reader/writer 10 in accordance with flowcharts (described later) is stored in advance in a ROM 62 which is connected to the CPU 52.

In the magnetic prepaid card 14 shown in FIG. 2, value data a content of which is changed for each writing operation as well as fixed data which includes identification data for ensuring security by distinguishing the prepaid card from a prepaid card of another prepaid card system, an operator code representative of a person who operates the prepaid card system, and etc. are recorded in the magnetic prepaid card 14 as shown in FIG. 2. The value data includes value data being held in the prepaid card presently and value data at a timing when the latest processing has been completed, and recording portions 14a and 14b for recording such two kinds of value data are set in the magnetic prepaid card 14.

In brief, in one embodiment of the present invention, after the magnetic prepaid card 14 is entered in the reader/writer 10 and the data thereof is read, a predetermined inspection code or data is written in the recording portion 14b. Then, the reader/writer 10 reads the inspection data from the recording portion 14b to judge whether or not the inspection data is correctly written. By checking such inspection data by the reader/writer 10, it is possible to judge any failure or abnormality occurs in the magnetic head 46 and the reading circuit 54 or the writing circuit 56. Then, if the magnetic head 48 and the writing circuit are in their normal states, renewed value data after payment or settlement for transactions is written in the recording portion 14b. At this time, in the recording portion 14a, the value data after the latest settlement for transactions is written.

In addition, as the inspection data, if the same does not coincide to the value data, arbitrary data can be set. However, if a code or data representing that a prepaid card in which this code or data is recorded is invalid is set as the inspection data, a further advantage can be obtained. More specifically, in a state where the data is read from the magnetic prepaid card 14 by the reader/writer 10 and the prepaid card remains therein, if the prepaid card is forcedly and unfairly returned from the reader/writer 10, at this time, the inspection data for judging the presence or absence of any failure of the magnetic head 48 and etc. is written in the recording portion 14b of the prepaid card 14. Therefore, if the inspection data is a code or data representative of invalidity of the magnetic prepaid card, even if the prepaid card which is forcedly and unfairly returned is entered in another reader/writer, a receipt of the prepaid card is rejected, and resultingly, it is possible to effectively prevent such a kind of an unfair practice.

Meanwhile, in the following embodiments, as the inspection data representative of the invalidity of the prepaid card, data representing that the residual value data of the prepaid card is "0" is used. In this case, if the data "0" is initially recorded in the recording portion 14b of the prepaid card as the residual value data, as described later, such a prepaid card is returned before the inspection data is newly written, and therefore, "0" of the value data does not coincide with "0" of the inspection data.

FIGS. 4A–4F are flowcharts showing an operation which is executed by the CPU 52 of the reader/writer 10 in accordance with the program stored in the ROM 62 (FIG. 3). In the following, an operation will be described in detail with reference to the flowcharts.

Stand-by State

Figure 4A:
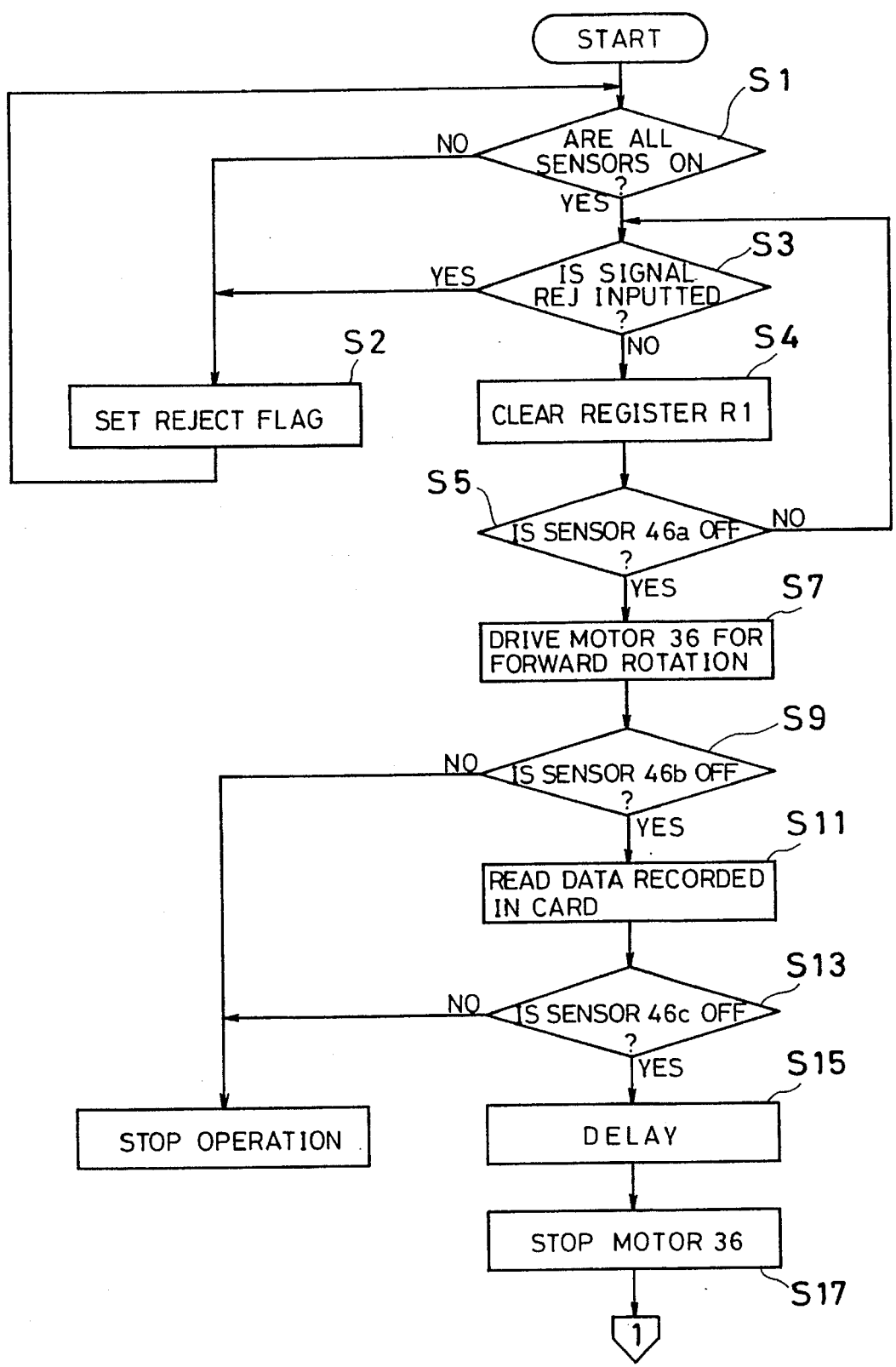
FIGS. 4A–4F are flowcharts showing an operation of one aspect of FIG. 1 embodiment.

At first, in a step S1 shown in FIG. 4A, the CPU 52 determines whether or not all the sensors 46a–46c are in on-states based upon signals from the sensors 46a–46c. When the magnetic prepaid card 14 is stopped within the reader/writer 10, at least one of the sensors 46a, 46b and 46c becomes in an off-state. In this case, the CPU 52 sets a reject flag in the register R1 in a step S2. In a step S3, the CPU 52 determines whether or not a card reject signal REJ is outputted from the supervisory machine 58.

The supervisory machine 58 outputs the card reject signal REJ for designating inhibition of the receipt of the prepaid card to the reader/writer 10 when it becomes impossible to predetermined processes such as settlement for transactions on the basis of the value data remained in the prepaid card. When the card reject signal REJ is inputted to the CPU 52, the CPU 52 sets the reject flag in the previous step S2. Therefore, even if the prepaid card is entered in the reader/writer 10 and the sensor 46a is turned-off, the CPU 52 does not drive the motor 36.

However, when all the sensors 46a–46c are in the on-states and no card reject signal REJ is inputted from the supervisory machine 58, in a step S4, the CPU 52 clears the register R1 (FIG. 3) and releases the reject flag if the same is set. Thus, the reader/writer 10 is brought in a state where the prepaid card can be received. Then, in a step S5, the CPU 52 determines whether or not the prepaid card is entered to the reader/writer 10 by checking whether or not the sensor 46a becomes in an off-state.

Reading Prepaid Card Data

When entrance of the prepaid card is detected, the reader/writer 10 enters in a card data reading operation, and therefore, in a step S7, the CPU 52 drives the motor 36 in a forward direction. Therefore, the rotation force of the motor 36 is transferred to the pulley 28a, the prepaid card which is entered from the prepaid card insertion port 12 is transferred inside the reader/writer 10. In a step S9, the CPU 52 determines whether or not the prepaid card reaches the magnetic head 48 by checking whether or not the sensor 46b is in an off-state. If the sensor 46b does not become in the off-state within a predetermined time in the step S9, an abnormality is determined, and therefore, an operation of the reader/writer 10 is stopped.

When the prepaid card reaches the magnetic head 48, the sensor 46b is turned-off, in a step S11, the CPU 52 outputs the read start signal RST to the reading circuit 54 to start a reading operation. A read control signal RE is outputted from the reading circuit 54 to the magnetic head 48, so that the magnetic head 48 is scanned on the magnetic recording portion (magnetic stripe) of the prepaid card 14 to read a signal D recorded in the prepaid card. The signal D is converted into a data pulse DP which is given in turn to the CPU 52 together with a clock pulse CP1. The CPU 52 proceeds to a next step S13 after sequentially taking-in the data pulse DP in synchronous with the clock pulse CP1 and storing in the register R2. In the step S13, the CPU 52 determines whether or not the prepaid card reaches a position of the sensor 46c by checking an off-state of the sensor 46c. If the sensor 46c is not turned-off within a predetermined time, an abnormal state is determined, and therefore, an operation of the reader/writer 10 is stopped. A trailing end portion of the prepaid card still remains at a position of the magnetic head 48 at a stage that the prepaid card 14 reaches the sensor 46c, and therefore, in a next step S15, the prepaid card is continuously fed for a predetermined delay time and, in a step S17, the CPU 52 stops the driving of the motor 36.

Figure 4B:
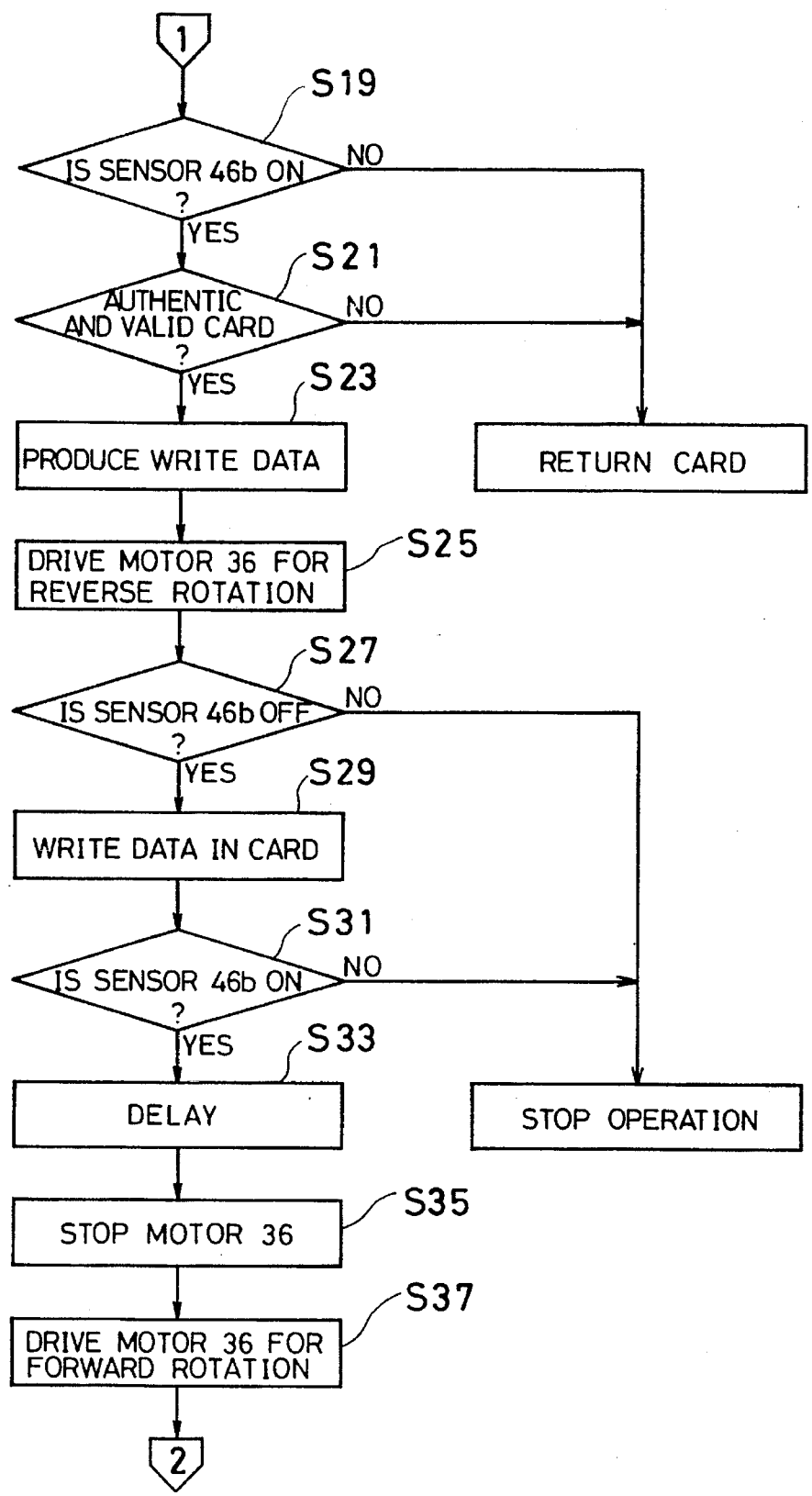

In a step S19 shown in FIG. 4B, the CPU 52 determines whether or not the trailing end portion of the prepaid card is detached from the magnetic head 46 by checking an on-state of the sensor 46b. In a case where a prepaid card having a proper length is entered, the sensor 46b is turned-on after the above described predetermined delay time elapsed because the prepaid card is detached from the magnetic head 48; however, when the sensor 46b remains in the off-state thereof in the step S19, it is determined that a prepaid card being improper is entered, and therefore, the motor 36 is driven for a reverse rotation to return the prepaid card from the prepaid card insertion port 12. Then, if the entered prepaid card has the proper length, the prepaid card is stopped within the reader/writer 10 in a state where a leading end portion of the prepaid card is at a position of the sensor 46c.

Then, in a next step S21, the CPU 52 determines an authenticity of the prepaid card on the basis of the identification data of the fixed data as read. If the prepaid card is not an authentic one, the motor 36 is driven for a reverse rotation to return the prepaid card. Even if the prepaid card is authentic, when the value data recorded in the recording portion 14b of the prepaid card is "0", the prepaid card is also returned. Therefore, the prepaid card which is forcedly and unfairly returned after the data "0" is written as the inspection data is returned out of the reader/writer 10 because the prepaid card holds the data "0" in the recording portion 14b thereof.

Check of Read/Write Functions

If the prepaid card is authentic and valid, the CPU 52 executes a process after a step S23 in order to check read/write functions.

In the step S23, write data is produced in the register R3 (FIG. 3). In addition, the write data is the same as the data which was read from the recording area, i.e. magnetic stripe of the prepaid card 14 and stored in the register R2. However, the write data is produced in the register R3 in a manner that a data arrangement is converted so as to write the value data read from the recording portion 14b in the recording portion 14a and that the inspection data "0" can be written in the recording portion 14b.

Then, the CPU 52 drives the motor 36 for a reverse rotation in a next step S25, and determines whether or not the prepaid card reaches a position of the magnetic head 48 by checking an off-state of the sensor 46b in a further next step S27. The sensor 46b is not turned-off within a predetermined time in the step S27, an abnormal state is determined, and therefore, an operation of the reader/writer 10 is stopped.

When the sensor 46b is turned-off in response to the arrival of the prepaid card at the magnetic head 48, in a step S29, the CPU 52 outputs the write start signal WST to the writing circuit 56 to start a writing operation. More specifically, the CPU 52 sequentially outputs the write data stored in the register R3 to the writing circuit 56 in synchronous with a pulse from the rotary encoder 42; however, this writing operation is performed when the prepaid card is fed in a direction opposite to a direction of the reading operation, and therefore, the CPU 52 outputs the write data to the writing circuit 56 by changing the order from the start to the end. The write data pulse WDT from the CPU 52 is taken-into the writing circuit 56 in synchronous with an encoder pulse CP2, and the writing circuit 56 data represented by the pulse WDT into an analog write signal WT which is outputted in turn to the magnetic head 48 together with a write control signal WR. Thus, the data is written in the prepaid card by the magnetic head 48.

In a next step S31, the CPU 52 determines whether or not the prepaid card passed through the position of the magnetic head 48 by checking an on-state of the sensor 46b. At this time, when the sensor 46b is not turned-on within a predetermined time, an operation of the reader/writer 10 is stopped.

When the on-state of the sensor 46b is detected, the CPU 52 secures a predetermined delay time to slightly detach the prepaid card from the magnetic head 48 in a step S33, and thereafter, the CPU 52 stops the driving of the motor 36 in a step S35. By stopping the motor 36 in a state where the prepaid card is kept apart from the magnetic head 48 at a predetermined distance, when the prepaid card is passed through the position of the magnetic head 48 by driving the motor 36, the prepaid card is passed through after a predetermined time elapsed from a raise of the motor 36 and thus a movement of the prepaid card becomes stable, and therefore, in the reading or writing operation, it is possible to prevent erroneous operations. Then, in a step S37, the CPU 52 drives the motor for a forward rotation after a delay time necessary for protecting the motor 36 so as to feed the prepaid card in a direction to the sensor 46b again.

Figure 4C:
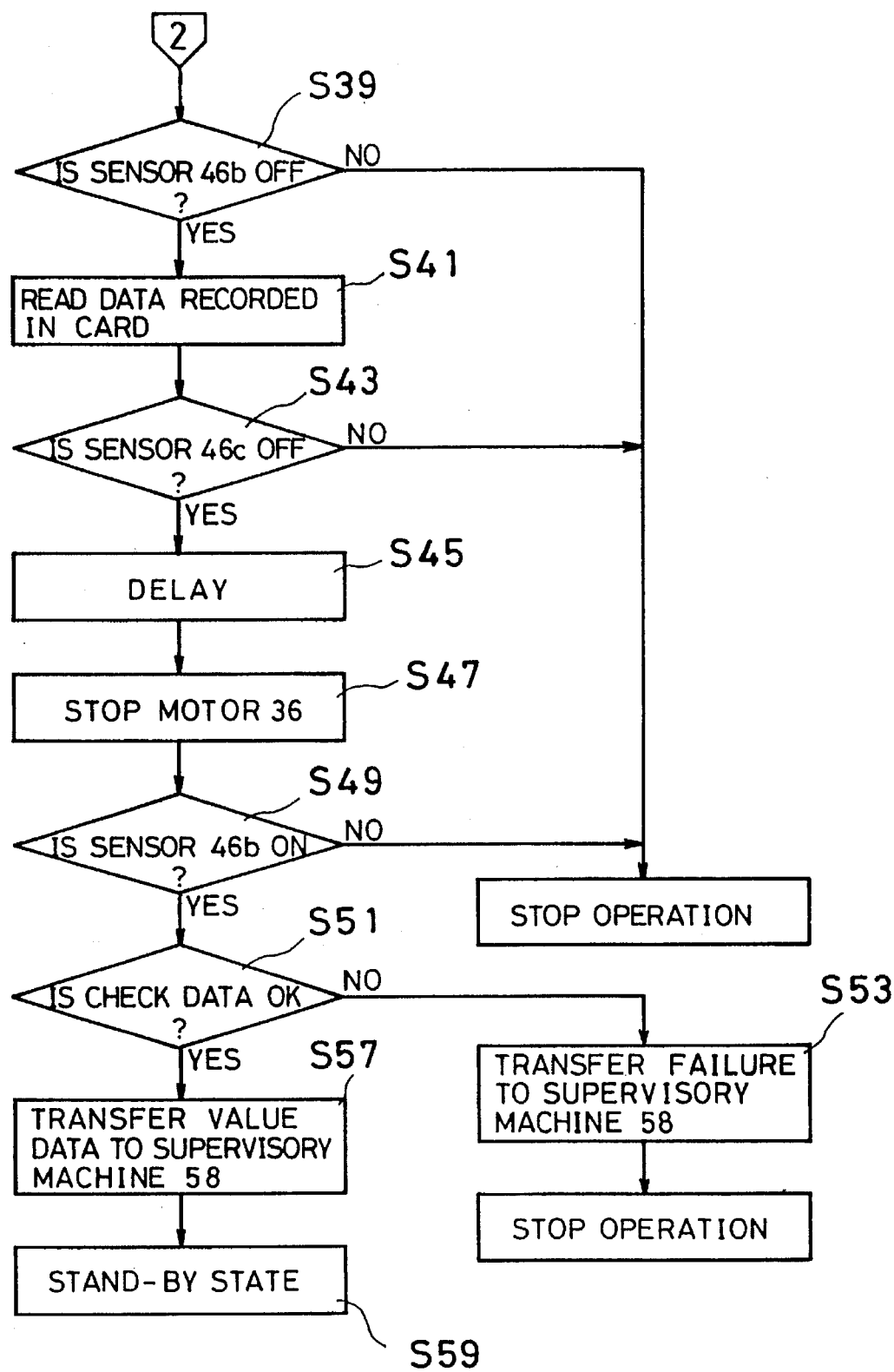

Thereafter, in a step S39 shown in FIG. 4C, the arrival of the prepaid card is detected by checking an off-state of the sensor 46b, and if the sensor 46b is not turned-off within a predetermined time, an operation of the reader/writer 10 is stopped.

When the prepaid card arrived at the position of the magnetic head 48, the sensor 46b is turned-off, and then the CPU 52 outputs the read start signal RST to the reading circuit 54 in a step S41, and, in response thereto, the reading operation is started. Then, in a step S43, the CPU 52 determines whether or not the prepaid card arrived at a position of the sensor 46c by checking an off-state of the sensor 46c. If the sensor 46c is not turned-off within a predetermined time, an abnormality is determined, and therefore, an operation of the reader/writer 10 is stopped. When the prepaid card reaches the sensor 46c, the process proceeds to a next step S45 wherein the prepaid card is continuously fed for a predetermined delay time, and in a next step S47, the CPU 52 stops the driving of the motor 36. In a next step S49, the CPU 52 checks an on-state of the sensor 46b and, if the sensor 46b is turned-on, process proceeds to a step S51. However, if the sensor 46b is not turned-on, an operation of the reader/writer 10 is stopped.

In the step S51, the CPU 52 derives data which has been recorded in the recording portion 14b from the data which were read in the step S41, and it is determined whether or not the derived data is "0". That is, the CPU 52 judges whether or not an abnormal state or failure develops in the writing head of the magnetic head 48 and the writing circuit 56. The derived data from the recording portion 14b is data other than "0", the CPU 52 determines that the writing head and/or the writing circuit 56 go wrong, and proceeds to a next step S53.

In the step S53, an operation of the reader/writer is stopped after the CPU 52 communicates to the supervisory machine 58 that a write function goes wrong. However, in a case where the inspection data of the data which was read in the step S41 is "0", the CPU 52 determines that no failure or abnormal state develops in the write function, and proceeds to a step S57.

The CPU 52 transfers the present value data held in the prepaid card to the supervisory machine 58 in the step S57, and thereafter, in a step S59, the CPU 52 waits for that residual value data after settlement for transactions is sent from the supervisory machine 58. This stand-by state is a state where the prepaid card is stopped in a manner that only the leading end portion exists at the position of the sensor 46c, and the latest value data is recorded in the recording portion 14a and the inspection data, i.e. the data "0" is recorded in the recording portion 14b. Therefore, even if the prepaid card is forcedly and unfairly returned from the reader/writer 10 in this state, since the prepaid card is in the same state where "0" is written in the recording portion 14b as the present (residual) value data, and resultingly, it is possible to prevent the prepaid card from being forcedly and unfairly returned.

Writing Renewed Data

The supervisory machine 58 processes the transactions on the basis of the value data transferred from the reader/writer 10, and if the supervisory machine 58 is a vending machine, for example, renewed value data which is a residual value data after an item is sold and a price thereof is subtracted from the present value data is transferred to the CPU 52 through the interface 60.

Figure 4D:
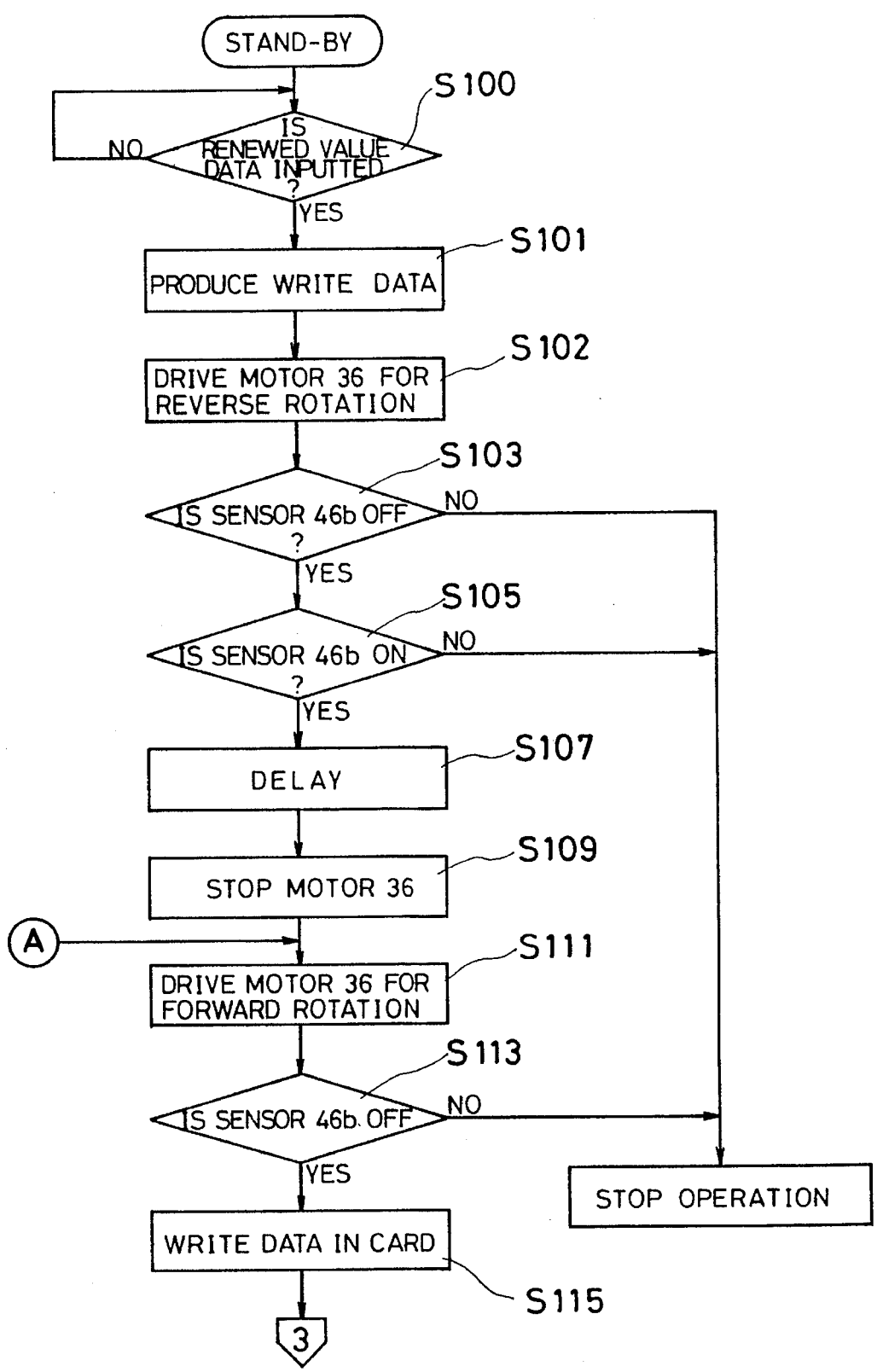

When an input of the renewed value data is confirmed in a step S100 shown in FIG. 4D, in a step S101, the residual value data is set in a region where the inspection data "0" has been stored of the register R3 to produce the write data, and thereafter, the process proceeds to a step S102.

The CPU 52 drives the motor 36 for a reverse rotation in the step S102, and in a step S103, the CPU 52 determines whether or not the prepaid card reaches the magnetic head 48 by checking an off-state of the sensor 46b. If the sensor 46b is not turned-off within a predetermined time, an operation of the reader/writer 10 is stopped. When the sensor 46b is turned-off, in a step S105, the CPU 52 determines whether or not the prepaid card has been passed through the magnetic head 48 by checking an on-state of the sensor 46b and, if the sensor 46b is not turned-on within a predetermined time, an operation of the reader/writer 10 is stopped.

Then, when the sensor 46b is turned-on the prepaid card is continuously fed for a predetermined delay time in a step S107, and thereafter, the motor 36 is stopped in a step S109. In a next step S111, after ensuring a few delay time for protecting the motor 36, the CPU 52 drives the motor 36 for a forward rotation to feed the prepaid card in a direction toward the magnetic head 48. Then, in a step S113, the CPU 52 determines whether or not the prepaid card arrived at the magnetic head 48 by checking an off-state of the sensor 46b. If the sensor 46b is not turned-off within a predetermined time, a failure or abnormal state is determined, and therefore, an operation of the reader/writer 10 is stopped.

When the sensor 46b is turned-off in response to the arrival of the prepaid card at the magnetic head 48, in a step S115, the CPU 52 outputs the write start signal WST to the writing circuit 56, and in response thereto, the writing operation is started. More specifically, the CPU 52 sequentially outputs the write data being stored in the register R3 to the writing circuit 56 in synchronous with the pulse from the rotary encoder 42, and the writing circuit 56 takes-in the write data pulse WDT which is thus inputted in synchronous with the same pulse. Thus, the data is written in the magnetic stripe of the prepaid card 14 by the magnetic head 48.

Figure 4E:
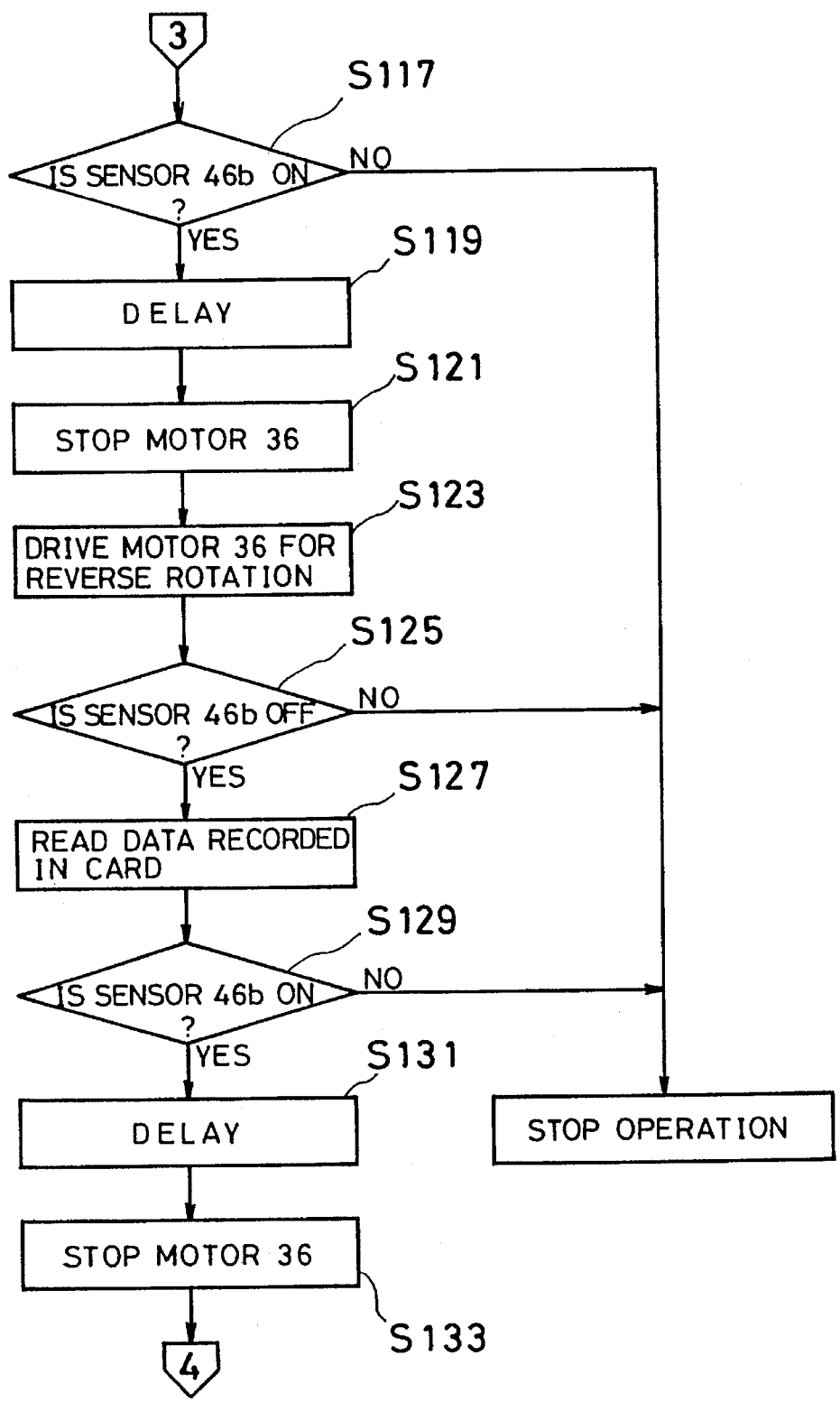

In a step S117 shown in FIG. 4E, the CPU 52 determines whether or not the prepaid card has been passed through the magnetic head 48 by checking an on-state of the sensor 46b. If the sensor 46b is not turned-off within a predetermined time, an operation of the reader/writer 10 is stopped. In response to a detection of an on-state of the sensor 46b, after the prepaid card is continuously fed for a predetermined delay time in a step S119, in a step S121, the CPU 52 stops the driving of the motor 36.

Then, in a step S123, after ensuring a delay time for protecting the motor 36, the motor 36 is driven for a reverse rotation so as to feed the prepaid card in a direction toward the magnetic head 48. In a next step S125, the CPU determines whether or not the prepaid card arrived at the magnetic head 48 by checking an off-state of the sensor 46b. If the sensor 46b is not turned-off within a predetermined time, an operation of the reader/writer 10 is stopped.

Then sensor 46b is turned-off in response to the arrival of the prepaid card at the magnetic head 48, in a step S127, the CPU 52 outputs the read start signal RST to the reading circuit 54. Thus, a reading operation is started. The reading circuit 54 applies data which is read in a manner similar to the previously described manner from the magnetic stripe to the CPU 52. The CPU 52 stores the data in the register R4. In a next step S129, the CPU 52 determines whether or not the prepaid card has been passed through the magnetic head 48 by checking an on-state of the sensor 46b. If the sensor 46b is not turned-on within a predetermined time, an operation of the reader/writer 10 is stopped.

The on-state of the sensor 46b is detected, the CPU 52 stops the driving of the motor 36 in a step S133 after ensuring a predetermined delay time to continuously feed the prepaid card in a step S131.

Figure 4F:
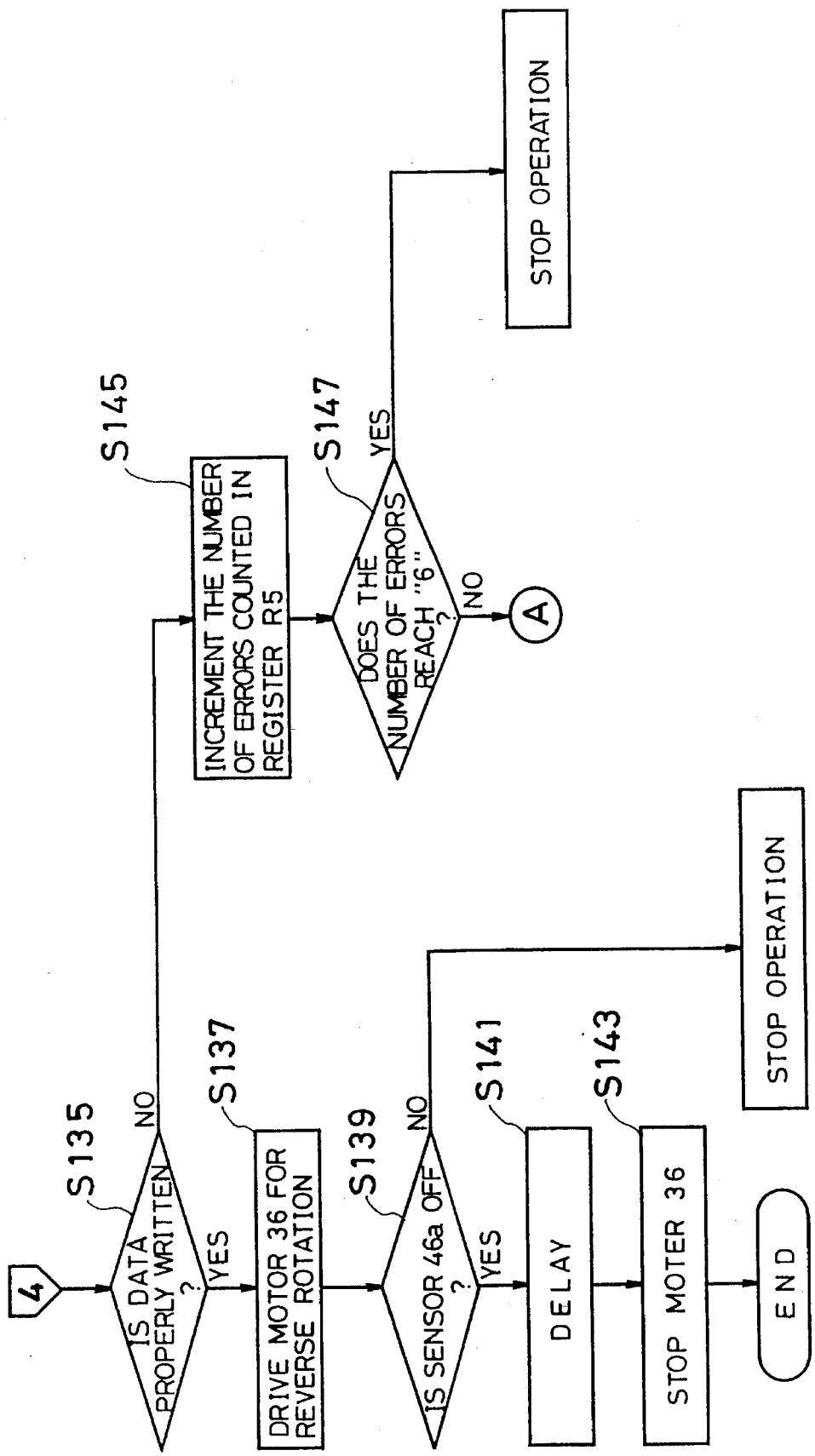

In a step S135 shown in FIG. 4F, the CPU 52 determines whether or not the data is properly written in the prepaid card by comparing the data being stored in the register R4 with the data being stored in the register R3. When both the data are coincident with each other, in a next step S137, the CPU 52 drives the motor 36 for a reverse rotation after ensuring a delay time for protecting the motor 36 so as to feed the prepaid card to the insertion port 12. In a step S139, the CPU 52 checks an off-state of the sensor 46a. If the sensor 46a is not turned-off within a predetermined time, an operation of the reader/writer 10 is stopped. When the sensor 46a is turned-on in response to the arrival of the prepaid card, the CPU 52 continuously feeds the prepaid card by ensuring a delay time so as to further lead the prepaid card toward the insertion port 12 in a step S141, and thereafter, the CPU 52 stops the driving of the motor 36 in a step S143. Thus, the prepaid card can be returned from the prepaid card insertion port 12.

Then, if it is determined that the data was not properly written in the prepaid card in the step S135, the CPU 52 increments by "1" the content of the register R5 for counting the number of errors in writing the data. In a next step S147, the CPU 52 determines whether or not the number of errors counted in the register R5 reaches "6". Then, until the number of errors reaches "6", the process returns to the previous step S111 and the data is written again in the prepaid card. However, when the number of errors reaches "6", the CPU 52 stops an operation of the reader/writer 10.

In another embodiment, the above described two kinds of value data are recorded in the recording portion 14a and 14b, respectively after the same are encoded, and data representative of a method for decoding the value data thus encoded (decoding data) is recorded in another recording portion 14c. As a method for encoding, there is a method for encoding the value data through logical operation of the value data with specific data, or a method for encoding the value data by rotating the same. In the former case, the decoding data may be data which results in the original value data through a logical operation of the encoded value data therewith. In the latter case, the decoding data may be data designating a rotation method which is capable of returning the encoded value data in the original data. Many kinds of rotation methods for decoding the data are set in the reader/writer 10 and the decoding data recorded in the recording portion 14c of the prepaid card is the data designating one of them. In addition, since the decoding data is set as 8-bit code, it is possible to set 256 kinds of encoding methods at maximum.

In this another embodiment, when the magnetic prepaid card 14 is entered in the reader/writer 10, in accordance with the decoding data which was read from the recording portion 14c, the encoded latest value data which was read from the recording portion 14a and the encoded present value data which was read from the recording portion 14b are decoded, respectively.

Then, at a stage that a value data were decoded, the reader/writer 10 encodes the present value data in accordance with a further encoding method to record the same in the recording portion 14a and decoding data representative of the further encoding method in the recording portion 14c. However, the value data of "0" is encoded and recorded in the recording portion 14b. Then, after recording, the reader/writer 10 reads data recorded in the magnetic prepaid card 14 again to check whether or not the data which was read is coincident with the data intended to be written.

If the data is properly recorded in the magnetic prepaid card 14, the data which was read is coincident with the data intended to be written. However, if the data which was read is not coincident with the data intended to be written, it means that a read/write function goes wrong. As causes therefore, the abnormality of the writing circuit 56 and the writing head of the magnetic head 48 or the abnormality of the reading circuit 54 and the reading head of the magnetic head 48 may be considered.

When the abnormality of the read/write function is detected, the reader/writer 10 distinguishes the above described different causes from each other in a manner set forth in the following. More specifically, it is determined whether or not the data read from the prepaid card is coincident with the data initially recorded in the prepaid card. Then, both the data are coincident with each other, since no change occurs in the data of the magnetic prepaid card 14 before and after the writing operation, and therefore, in such a case, it is possible to determine that the abnormality develops in the write function. In addition, if both the data are not coincident with each other, the abnormality develops in the reading operation itself when the data is read again from the magnetic prepaid card 14, and therefore, in this case, it is possible to determined that the abnormality develops in the reading function.

In the case of the abnormality of the writing function, since it is difficult to correctly record the residual value data even if the operation is continued and any transaction is made, an operation of the reader/writer 10 is stopped. On the other hand, in a case of the abnormality of the reading function, such abnormality develops in the read function after correctly reading the data from the prepaid card and no abnormality occurs in the writing function, and therefore, an operation of the reader/writer 10 is continued. However, if the abnormality of the read function is continued, the operation of the reader/writer 10 is stopped.

FIG. 5A–5G are flowcharts showing an operation executed by the CPU 52 in the reader/writer 10 in accordance with the program stored in the ROM 62 (FIG. 3) in this embodiment.

Stand-by State

In a stand-by state, the same steps S1–S6 as that of FIG. 4a are executed. However, a duplicate description will be omitted here.

Reading Prepaid Card Data

Figure 5A:
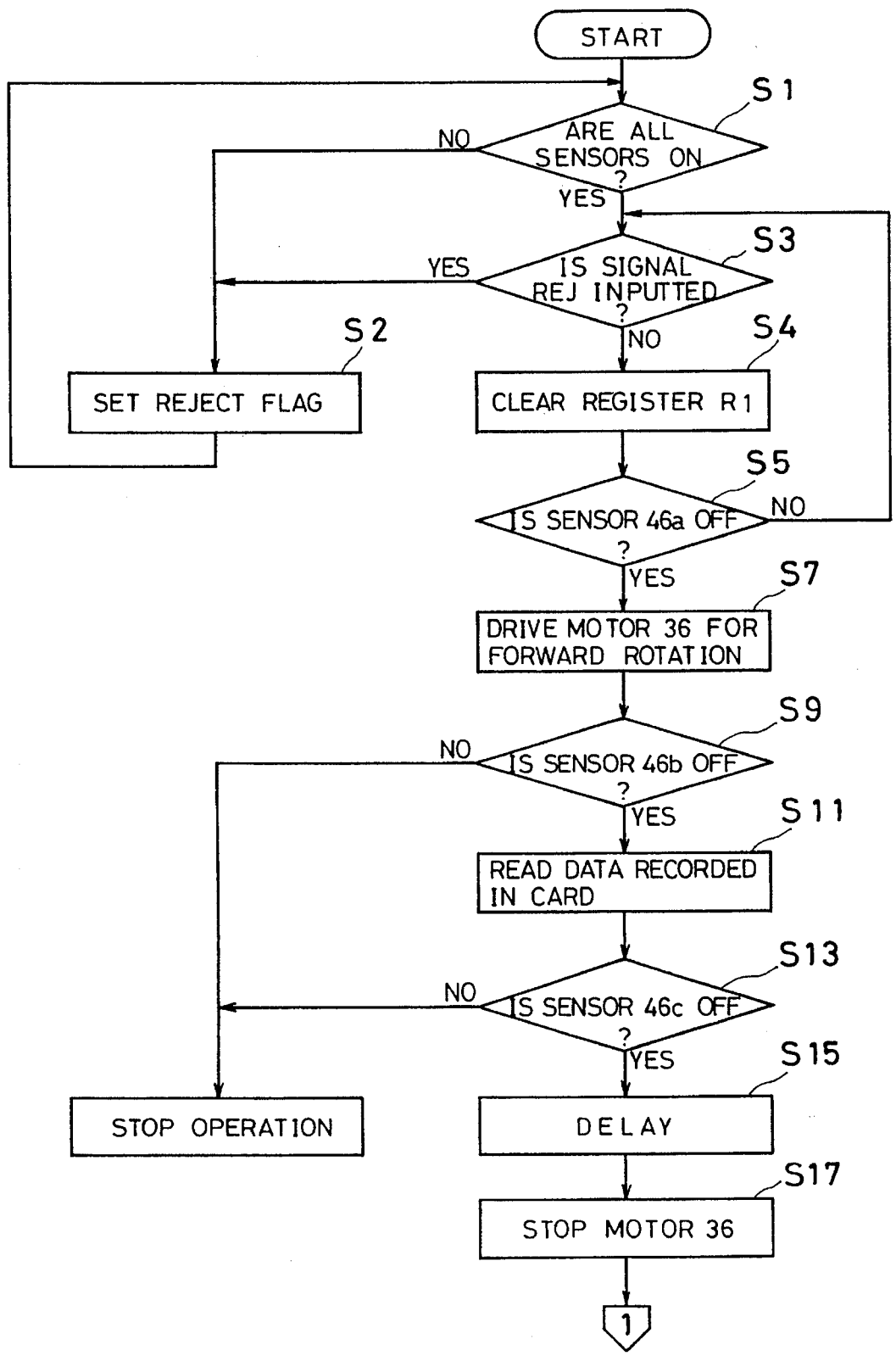
Figure 5B:
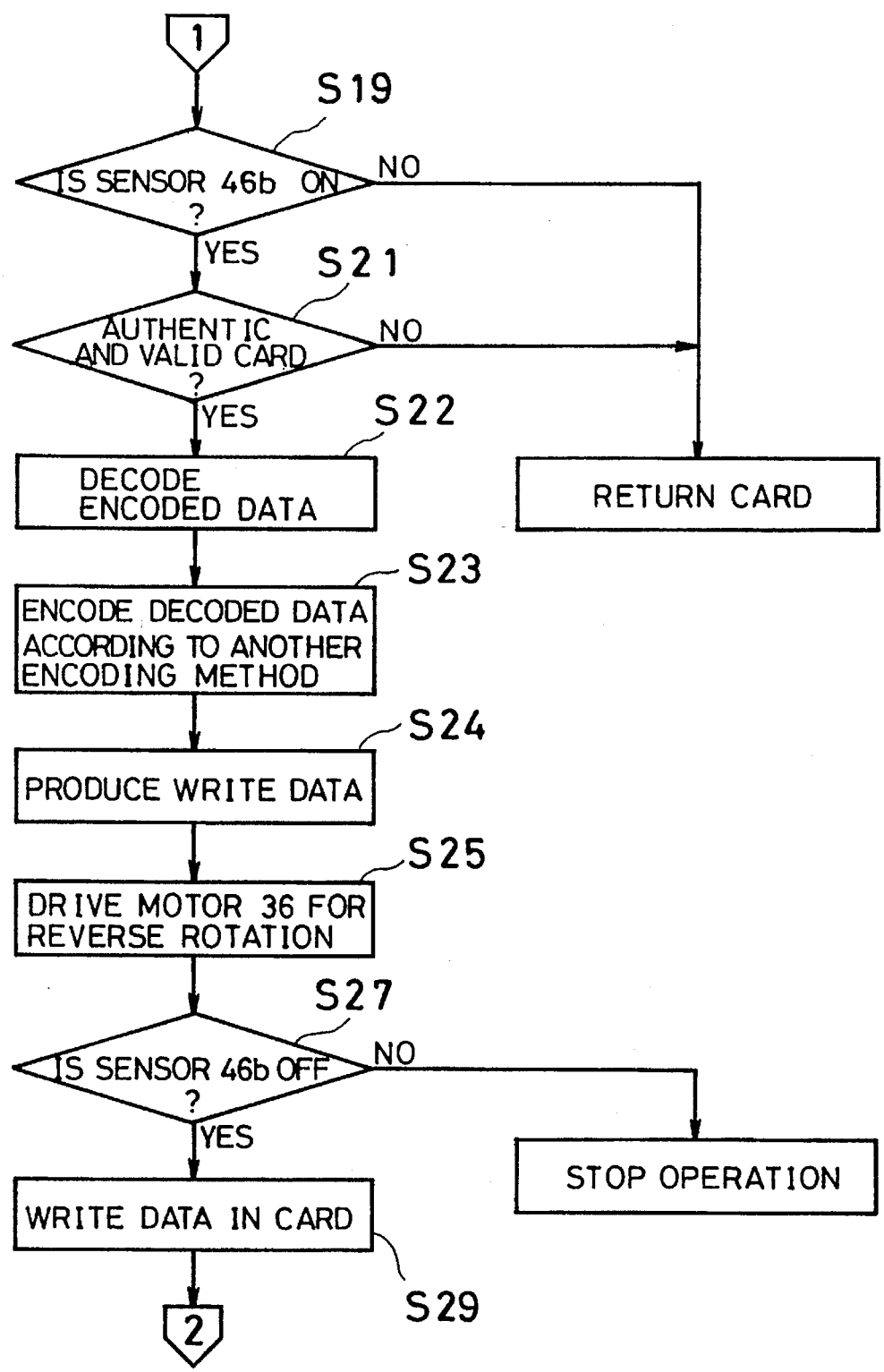
Figure 5C:
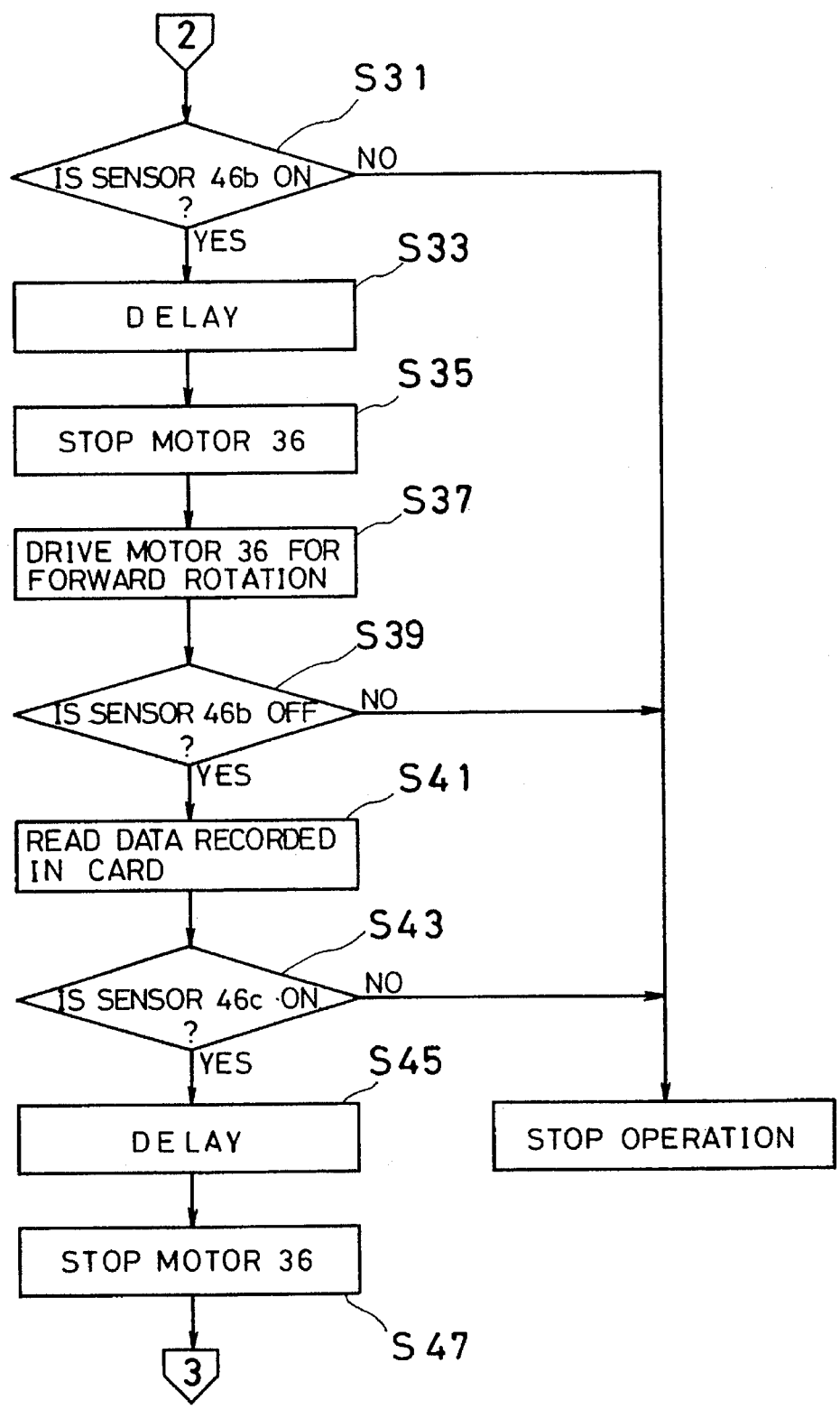

When the enter of the prepaid card is detected, the process proceeds to the prepaid card data reading operation; however, an operation from a step S7 of FIG. 5A to a step S21 of FIG. 5B are the same as the operation from the step 7 of FIG. 4A to the step S21 of FIG. 4B, and therefore, a description will not be repeated.

If the prepaid card is authentic and valid, the process of the CPU 52 proceeds to a step S22 wherein in accordance with the decoding data recorded in the recording portion 14c of the magnetic prepaid card 14, the encoded data representative of the latest value data recorded in the recording portion 14a and the encoded data representative of the present value data recorded in the recording portion 14b are decoded, respectively.

Check Read/Write Functions

The decoding the encoded value data which have been recorded in the prepaid card is completed, the CPU 52 executes a process after a step S23 in order to check the read/write functions.

In the step S23, the CPU 52 encodes the present value data which was decoded in the step S22 in accordance with a further encoding method which is a method shifted by one from the encoding method which was used in the latest writing operation. Then, in a next step S24, for checking the read/write functions, write data to be written in the card is produced in the register R3. At this time, although the fixed data to be written in the prepaid card is the data shown by the code which is read from the prepaid card and stored in the register R2, the CPU 52 produces the write data so that the present value data which is encoded by the further encoding method in the step S23 can be recorded in the recording portion 14a and the decoding data for decoding such encoded data can be recorded in the recording portion 14b. In addition, the inspection data "0" which is encoded in accordance with the further encoding method in the recording portion 14b.

Thereafter, the same steps S25 (FIG. 5B)–S45 (FIG. 5D) as that of the previous embodiment are executed.

Figure 5D:
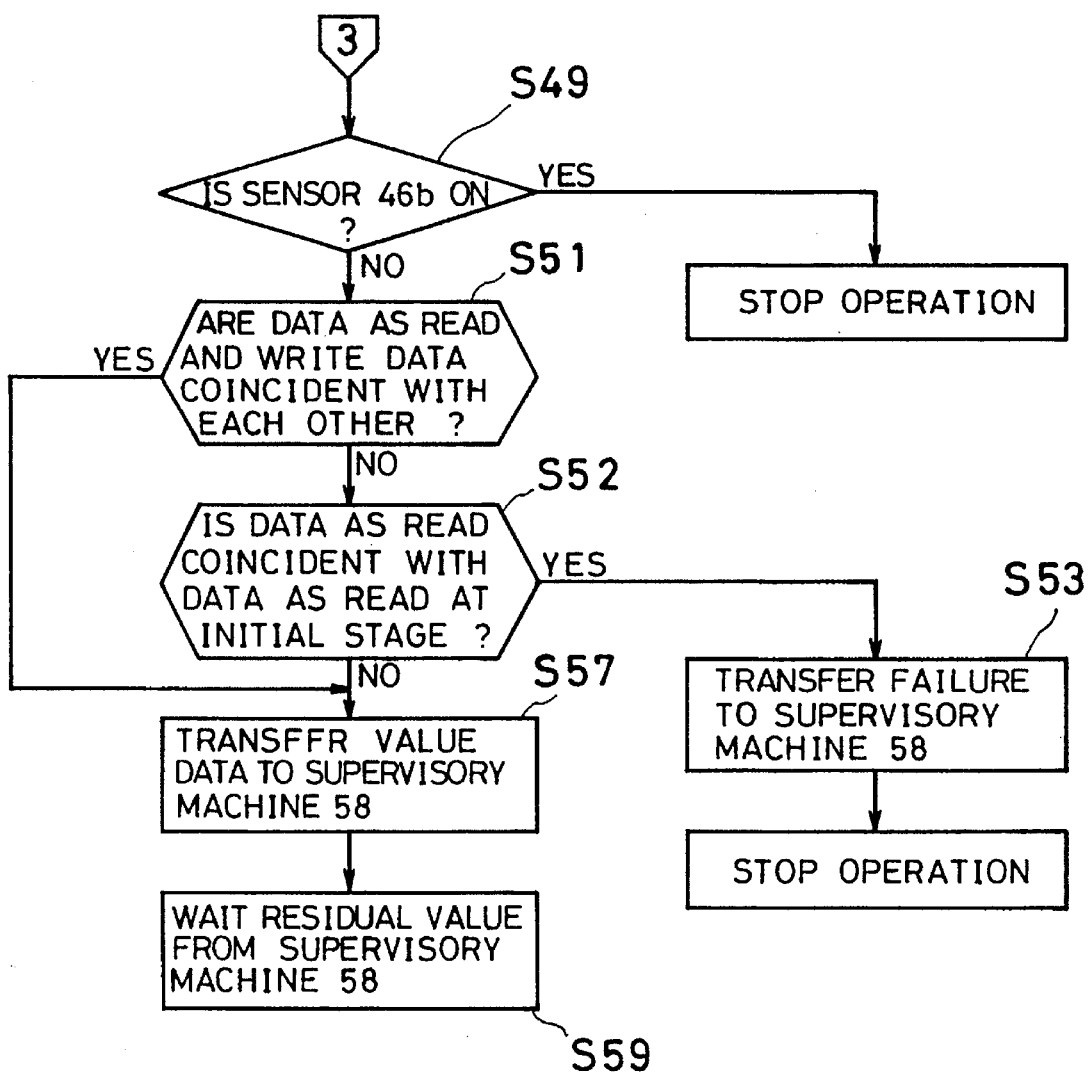

In a step S51 shown in FIG. 5D, the CPU 52 determines whether or not the data which was read and the write data being stored in the register R3 are coincident with each other. Then, if both the data are coincident with each other, it is determined that the writing operation is properly performed, and the process proceeds to a step S57; however, if both the data are not coincident with each other, the process proceeds to a step S52. In the step S52, the CPU 52 determines whether or not the data which was read is equal to the data which was read in the previous step S11 at the initial stage that the prepaid card is entered and held in the register R2. When the both are equal to each other, it means that the write data of the register R3 was not recorded in the prepaid card, and in such a case, the CPU 52 determines that the abnormality develops in the writing circuit 54 and/or the writing head of the magnetic head 48 and proceeds to a step S53 wherein the failure of the writing function is transmitted to the supervisory machine 58, and thereafter, an operation of the reader/writer 10 is stopped.

However, in a case where the data read in the step S41 and the data read in the step S11 are not coincident with each other, the CPU 52 determines that the abnormality develops in the reading operation in the step S41 while no abnormality occurs in the writing function, and proceeds to a step S57.

In the step S57, the CPU 52 transfers the present value data which is held in the prepaid card to the supervisory machine 58, and thereafter, in a step S59, the CPU waits that the residual value data after settlement for transactions may be sent from the supervisory machine 58.

Writing Renewed Data

Figure 5E:
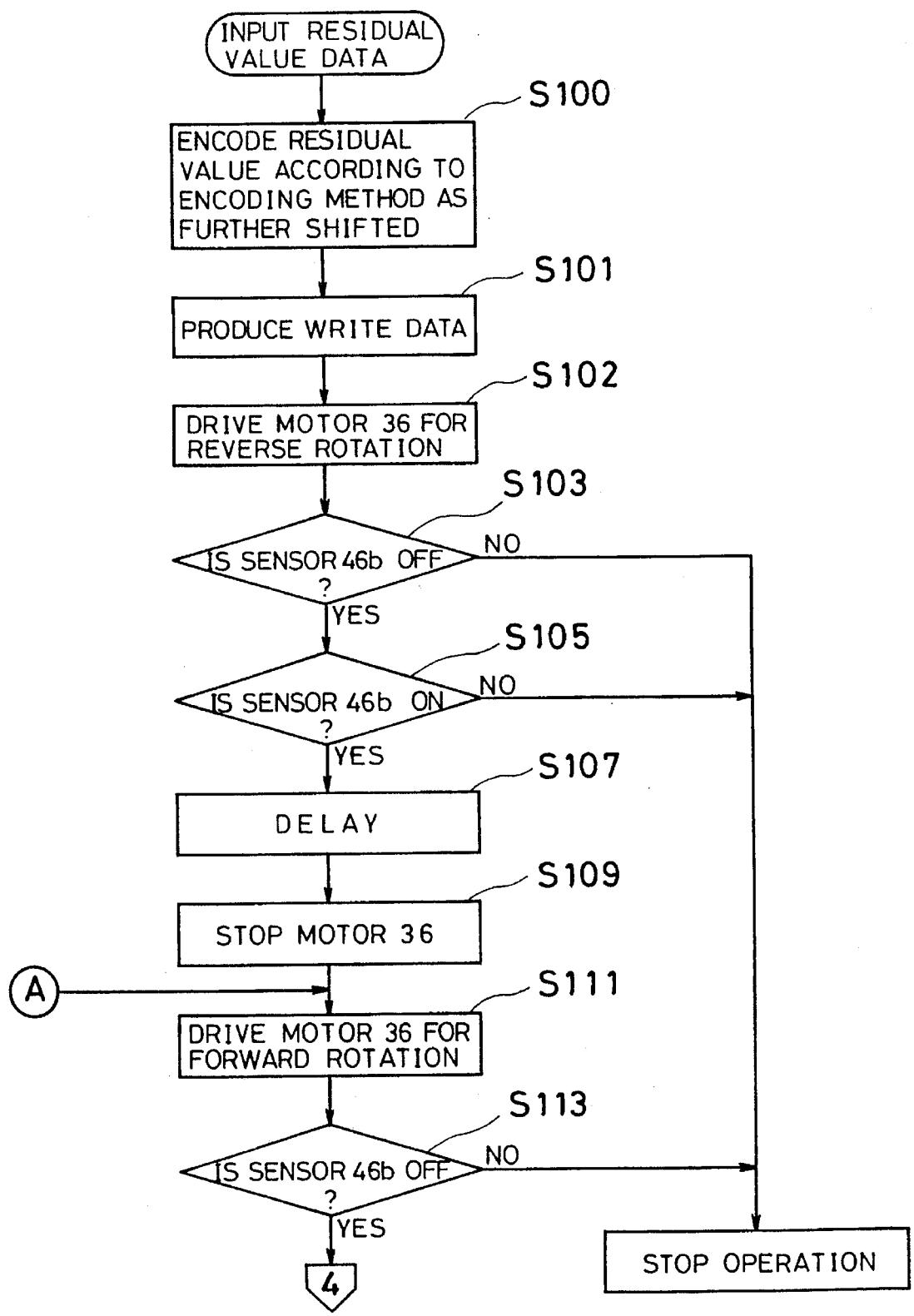
Figure 5F:
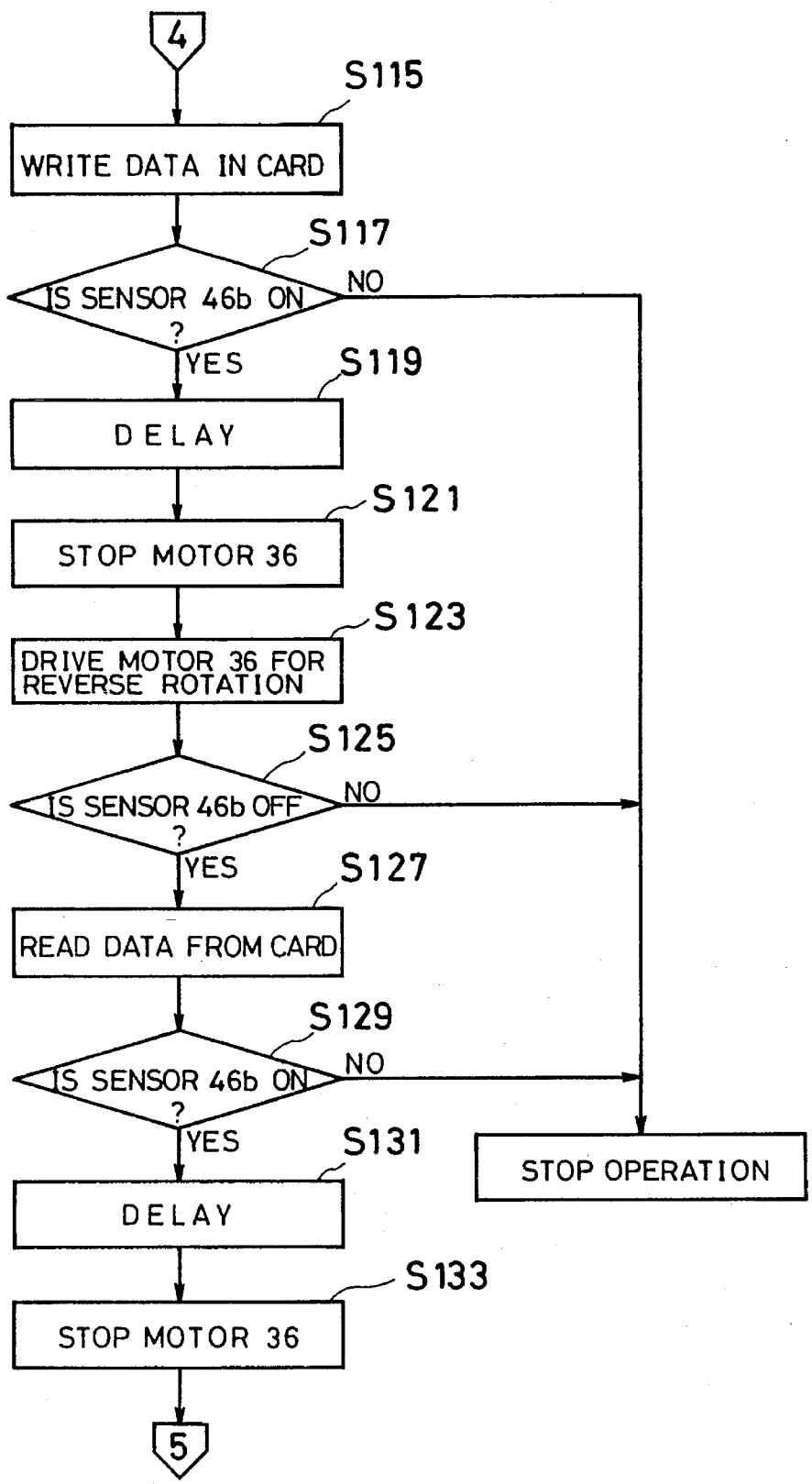

In this embodiment shown, when the renewed value data is transferred from the supervisory machine 58 to the CPU 52 through the interface 60, in a step S100 shown in FIG. 5E, the CPU 52 encodes the residual value data in accordance with a still further encoding method which is further shifted. Then, in a next step S101, the CPU 52 sets the encoded residual value data in an area in which the encoded value data "0" is stored of the register R3, and proceeds to a step S102.

Thereafter, as similar to the previous embodiment, the same steps S102–S147 (FIG. 5G) are executed.

In addition, the present invention is applicable to a prepaid card such as an IC prepaid card and etc. other than the magnetic prepaid card described in the above described embodiment.

Furthermore, the present invention is also applicable to an arbitrary card which has a value being equal to a predetermined amount of money other than the above described prepaid card.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A card handling apparatus, comprising;

a card entering portion;

reading means for reading data recorded in a card which is entered through said card entering portion;

writing means for writing data in a card which is entered through said card entering portion;

first means for controlling said writing means to write inspection data representative of invalidity of a card in a predetermined area of said card after the data is read by said reading means;

second means for controlling said reading means to read the data from said predetermined area of said card after said inspection data is written by said writing means;

judging means for outputting a signal representing that an abnormality has developed in said writing means when data read by said reading means under control of said second means from said predetermined area does not have a predetermined relationship with said inspection data; and third means for controlling said writing means to write renewal data in said card in response to said judging means failing to output said signal.

2. A card handling apparatus in accordance with claim 1, wherein said card is a prepaid card having a value equal to a predetermined amount of money.

3. A card handling apparatus in accordance with claim 2, wherein said card includes a first recording portion for writing a first value data after the latest handling and a second recording portion for writing a second value data after this latest handling, said predetermined inspection data being written in said second recording portion, said first and second value data differing from each other.

4. A card handling apparatus in accordance with claim 3 wherein said predetermined inspection data represents a residual value on the card of zero.

5. A card handling method, comprising the steps of:

(a) reading data recorded in a card which is entered;

(b) writing predetermined inspection data representative of invalidity of a card in a predetermined area of said card after reading said data;

(c) reading data from said card including that which is in the predetermined area after writing said predetermined inspection data;

(d) judging whether or not the data from said predetermined area as read in the step (c) has a predetermined relationship with said predetermined inspection data, and (e) writing renewal data in said predetermined area when it is judged in the step (d) that said predetermined relationship exists.

6. A card handling apparatus, comprising:

an entering portion for entering a card, said card including a first recording portion for writing encoded data and a second recording portion for writing decoding data for decoding said encoded data;

decoding means for decoding the encoded data read from said first recording portion of the card entered from said card entering portion in accordance with the decoding data recorded in said second recording portion;

encoding means for encoding data to be written in said card; and first writing means for writing the encoded data encoded by said encoding means in said first recording portion and the decoding data for decoding the encoded data in said second recording portion, said encoding means encoding said data to be written in accordance with a further encoding method capable of being decoded by further decoding data which is different from the decoding data which has been recorded in said second recording portion, and said first writing means writing said further decoding data in said first recording portion for decoding said data encoded in accordance with said further encoding method in said second recording portion of said card, said data written by said first writing means being decoded by said decoding means in accordance with said further decoding data, said apparatus further comprising;

first judging means for determining prior to writing by said first writing means whether or not the data decoded by said decoding means in accordance with said further decoding data is coincident with the data before being further encoded by said encoding means, said first judging means outputting a first signal when the both data are not coincident with each other.

7. A card handling apparatus in accordance with claim 6, further comprising second judging means for determining whether or not the data decoded by said decoding means in accordance with said further decoding data is coincident with the first recording portion of the data which has been recorded in the card before being entered, when said first judging means determines that both data are not coincident with each other, said second judging means outputting a second signal when both data are not coincident with each other.

8. A card handling apparatus in accordance with claim 7, wherein said data to be written is encoded by said encoding means in accordance with a third encoding method different from said further encoding method when both said first signal and said second signal are outputted, said apparatus further comprising:

second writing means for writing the encoded data encoded by said encoding means in accordance with said third encoding method and third decoding data which is different from said further decoding data and for decoding said data encoded in accordance with said third encoding method in said first and second recording portions, respectively.

9. A card handling method, comprising steps of:

(a) receiving a card, said card including a first recording portion for writing encoded data and a second recording portion for writing decoding data for decoding said encoded data;

(b) reading the encoded data from said first recording portion;

(c) decoding said encoded data in said step (b) in accordance with the decoding data recorded in said second recording portion;

(d) encoding data decoded in said step (c) in accordance with a further encoding method;

(e) writing again said encoded data encoded in said step (d), and further decoding data different from said decoding data which has been recorded in said second position and for decoding said encoded data encoded in accordance with said further encoding method in said first and second recording portion, respectively;

(f) reading said encoded data written in said step (e) from said first recording portion;

(g) decoding said encoded data read in said step (f) in accordance with said further decoding data recorded in said second recording portion in said step (e);

(h) determining whether or not the data decoded in said step (g) and data before being encoded in said step (d) are coincident with each other; and (i) determining whether or not said data decoded in said step (g) is coincident with said data decoded in said step (c) when discordance is determined in said step (h).

10. A card handling method in accordance with claim 9, further comprising the steps of: (j) encoding said data decoded in said step (c) in accordance with a still further encoding method when coincidence is determined in said step (h) or when discordance is determined in said step (h); and (k) writing said data encoded in said step (j) and still further decoding data different from said further decoding data and for decoding said data encoded in accordance with said still further encoding method in said first and second recording portion, respectively.

11. A card handling apparatus, comprising:

a card entering portion;

reading means for reading data recorded in a card that has entered through said card entering portion;

writing means for writing data in a card;

first means responsive to said reading means for controlling said writing means to write inspection data in an area of the card;

second means for controlling said reading means to read data from said area of the card after said inspection data has been written;

judging means for determining whether an abnormality in the writing means exists by making a comparison between the inspection data as read and inspection data intended to have been written whereby an absence of coincidence from the comparison signifies existence of an abnormality in the writing means, said judging means being responsive to the comparison revealing an absence of coincidence between the inspection data as read and intended to have been written for generating a signal indicative a determination that an abnormality exists in the writing means; and third means responsive to said judging means for controlling said writing means to write renewal data in response to said judging means failing to generate said signal.

\* \* \* \* \*